United States Patent [19]
Kelton et al.

[11] Patent Number: 5,926,503
[45] Date of Patent: Jul. 20, 1999

[54] DS-CDMA RECEIVER AND FORWARD LINK DIVERSITY METHOD

[75] Inventors: James R. Kelton, Oak Park; Phillip D. Rasky, Buffalo Grove, both of Ill.

[73] Assignee: Motorola, Inc., Schaumburg, Ill.

[21] Appl. No.: 08/920,558

[22] Filed: Aug. 27, 1997

[51] Int. Cl.$^6$ .............................. H04B 15/00; H04B 1/10; H04B 1/06
[52] U.S. Cl. ........................ 375/206; 375/349; 455/276.1
[58] Field of Search ...................... 375/210, 206, 375/346, 347, 349; 455/132, 137, 139, 276.1, 272, 65

[56] References Cited

U.S. PATENT DOCUMENTS

| | | | |
|---|---|---|---|
| 4,270,210 | 5/1981 | Tan et al. .................................. | 375/100 |
| 5,109,390 | 4/1992 | Gilhousen et al. .......................... | 375/1 |
| 5,347,535 | 9/1994 | Karasawa et al. ........................... | 375/1 |
| 5,513,176 | 4/1996 | Dean et al. ............................... | 375/200 |
| 5,563,610 | 10/1996 | Reudink ................................. | 342/375 |
| 5,577,265 | 11/1996 | Wheatley, III ........................... | 375/200 |

FOREIGN PATENT DOCUMENTS

WO 97/24818  7/1997  WIPO .

*Primary Examiner*—Stephen Chin
*Assistant Examiner*—Albert Park
*Attorney, Agent, or Firm*—Richard K. Clark; John G. Rauch

[57] ABSTRACT

A mobile station (104) in a DS-CDMA communication system (100) has receiver diversity. A first antenna (130) receives signals over a communications channel (101) from a base station (102). A second antenna (132) receives signals which are delayed in a delay element (142) by one or more chip times and combined in a summer (148) with signals from the first antenna. The combined signals are presented to a RAKE receiver (112) for decoding and demodulation. When discernible multipath energy is present to the point where much of the received signal energy is not accounted for in the assigned RAKE receiver fingers, the second antenna is switched out to avoid increasing the level of interference.

16 Claims, 4 Drawing Sheets

DS-CDMA RECEIVER AND FORWARD LINK DIVERSITY METHOD

FIELD OF THE INVENTION

The present invention generally relates to communication systems. More particularly, the present invention relates to direct sequence code division multiple access (DS-CDMA or CDMA) communication systems and use of space diversity in such systems.

BACKGROUND OF THE INVENTION

DS-CDMA or CDMA communication systems are being implemented as cellular telephone systems. A CDMA system includes a system controller and at least one base station. Each base station provides communication service to a fixed geographic area or cell. Mobile stations in a cell communicate with the base station for that cell. Communication with a mobile station is handed off among base stations as the mobile station moves among cells. One example of such a system is a system according to EIA/TIA interim standard 95 Mobile Station-Base Station Compatibility Standard for Dual-Mode Wideband Spread Spectrum Cellular System ("IS-95").

In CDMA systems including IS-95 systems, the communication link between mobile station and base station includes a forward link from base station to mobile station and a reverse link from mobile station to base station. A mobile station, as a consumer product, is tightly limited in its cost of materials and manufacturing cost. Therefore, the mobile station commonly omits redundant hardware components and other features. For example, such mobile stations have not used space diversity techniques to increase receiver sensitivity because to do so requires two antennas and two radio frequency (RF) signal processing paths in the mobile station as well as a diversity control circuit. Since a base station is not as limited in its cost, base stations typically employ such diversity techniques and others to improve receiver sensitivity. This results in a base station receiver which is more sensitive than the mobile station receiver and an unbalanced communication link.

One known DS-CDMA system provides a path diversity function. The base station includes multiple antennas each with an associated delay device. The time delays provide diversity operation in the base station. Nevertheless, this prior system is severely limited to use in applications in which the communications channel exhibits low delay spread, such as in-building, microcellular, wireless private branch exchange (PBX) systems. In channels with significant delay spread, the performance of the prior system is degraded as added, delayed rays can not be used to advantage but merely increase the level of intracell interference at the receiver.

Accordingly, there is a need in the art for an improved apparatus and method for mobile station receiver diversity in a DS-CDMA system.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
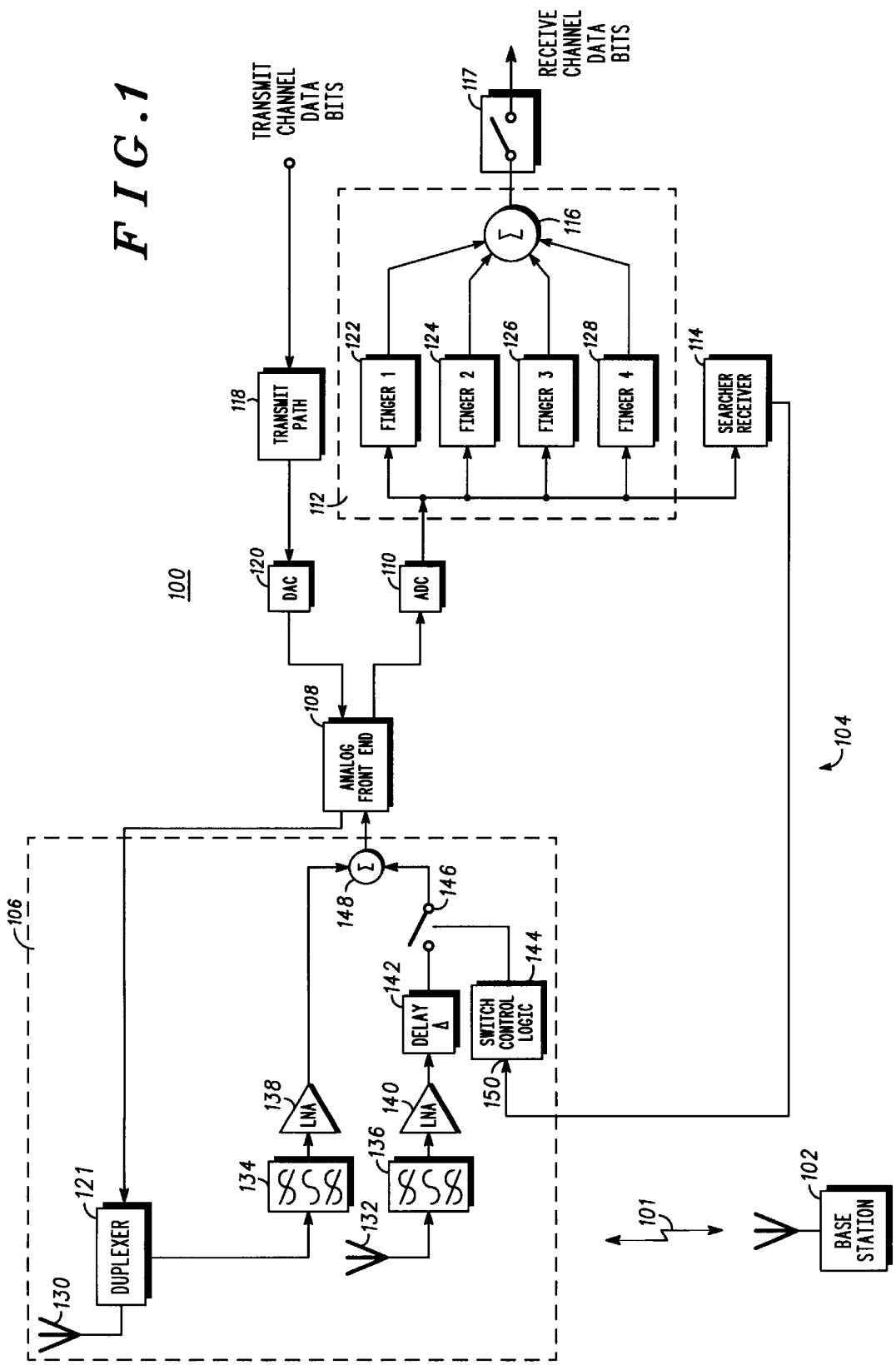
FIG. 1 is a block diagram of a communication system.

Referring now to FIG. 1, a communication system 100 includes a plurality of base stations including base station 102 which transmits communication signals over a communications channel 101 and a mobile station 104 for radio communication with the base station 102. The mobile station 104 is configured to receive and transmit direct sequence code division multiple access (DS-CDMA) signals to communicate with the plurality of base stations, including base station 102. In the illustrated embodiment, the communication system 100 operates according to Telecommunications Industry Association/Electronic Industry Association (TIA/EIA) Interim Standard IS-95, "Mobile Station-Base Station Compatibility Standard for Dual-Mode Wideband Spread Spectrum Cellular System," operating at 800 MHz. Alternatively, the communication system 100 could operate in accordance with other DS-CDMA systems including Personal Communication System (PCS) systems at 1800 MHz or with any other suitable DS-CDMA system.

The mobile radio communications channel 101 is usually modeled as consisting of several independent discernible rays, each ray exhibiting independent fading. The delay spread of a communications channel is a measure of the number and attenuation of each independent path from the transmitter to the receiver. For example, a communications channel may have two paths, one directly from the transmitter to the receiver and a second reflected off of a scatterer. Because the length of these paths is different and the velocity of light finite, this will cause two copies of the transmitted signal, slightly shifted in time, to be observed at the receiver. If these components are separate by a time greater than the inverse bandwidth of the channel, the rays are said to be discernible. Each of these rays possess uncorrelated time varying changes in amplitude and phase. This time varying process is referred to as fading. The fading process causes large fluctuations in the magnitude of each multipath ray. These fluctuations are caused by numerous close in scatters. Because these scatters are nearby, the differences in path lengths are not large enough to cause delays on the order of the inverse bandwidth of the channel and are not therefore discernible. The differences in path lengths are, however, large enough to affect the relative phase of the received signal. Therefore, as a mobile station moves relative to the base station, these close in reflections will add constructively at times and destructively at others, causing the large changes in amplitude and phase of the discernible rays. Often these amplitude and phase variations follow a Rayleigh distribution and are referred to as Rayleigh fading. The temporal correlation of this fading is a function of the mobile station's velocity and the wavelength of the carrier signal.

In mobile radio channels, the uncorrelated statistical properties of the individual rays allow these rays to be combined in a manner which will provide diversity gain in an appropriately designed receiver. One such receiver structure, described in greater detail below, is the RAKE receiver.

The base station 102 transmits spread spectrum signals to the mobile station 104. The symbols on the traffic channel are spread using a Walsh code in a process known as Walsh covering. Each mobile station such as the mobile station 104 is assigned a unique Walsh code by the base station 102 so that the traffic channel transmission to each mobile station is orthogonal to traffic channel transmissions to every other mobile station. The symbols are spread using a short pseudorandom noise (PN) sequence or code, which repeats every 26-⅔ ms and a long PN sequence or code, which repeats every 41 days. Communication on the radio frequency (RF) link from a base station to a mobile station 104 is in the form of spread data symbols. The data symbols are modulated using binary phase shift keying (BPSK). This is spread by multiplying the low rate data symbols by a high rate sequence of chips. The chips consist of a quaternary phase shift keyed (QPSK) sequence, the data for which is generated by the exclusive-or of the aforementioned Walsh sequence and the short PN sequence. The channel data rate for the IS-95 system is 19.2 kilobits/second and the chip rate is 1.2288 Mega-chips per second. The spreading gain is the ratio of the chip rate to the channel bit rate and is therefore 64 for IS-95. The resulting QPSK sequence is used to quadrature modulate a high frequency RF carrier for transmission.

In addition to traffic channels, the base station 102 broadcasts a pilot channel, a synchronization channel and a paging channel. The pilot channel is formed using an all-zero sequence that is covered by Walsh code 0, which consists of all zeros. The pilot channel is commonly received by all mobile stations within range and is used by the mobile station 104 for identifying the presence of a CDMA system, initial system acquisition, idle mode hand-off, identification of initial and delayed rays of communicating and interfering base stations, and for coherent demodulation of synchronization, paging, and traffic channels.

In addition to the Walsh covering, all channels transmitted by the base station are spread using a pseudorandom noise (PN) sequence, also referred to as the pilot sequence. The spread pilot channel modulates a radio frequency (RF) carrier and is transmitted to all mobile stations including the mobile station 104 in a geographic area or cell served by the base station 102.

The mobile station 104 comprises an input stage 106, an analog front end 108, a receive path including an analog to digital converter (ADC) 110, a RAKE receiver 112 and a searcher receiver 114, a combiner 116, a slicer 117, and a transmit path including a transmission path circuit 118, a digital to analog converter (DAC) 120 and a duplexer 121. Transmit channel bits are received by the transmit path circuit 118 and prepared for transmit to the base station 102. The transmit bits are converted to analog signals by DAC 120 and processed by the analog front end 108. The analog signals are coupled by the duplexer 121 to the first antenna 130 and transmitted.

The input stage 106 receives RF signals from the base station 102 and from other base stations in the vicinity. The RF signals transmitted from base station 102 are received after being altered by communications channel 101. This alteration includes generation of several time delayed copies of the transmitted signal with each delayed signal being independently altered in phase and amplitude by Rayleigh fading. Structure and operation of the input stage 106 will be described in further detail below.

Received RF signals are converted to electrical signals by the input stage 106 and provided to the analog front end 108.

The analog front end 108 filters the signals and provides conversion from RF signals to baseband signals. The analog baseband signals are provided to the ADC 110, which converts them to equivalent streams of digital data for further processing.

The RAKE receiver 112 includes a plurality of receiver fingers, including receiver finger 122, receiver finger 124, receiver finger 126 and receiver finger 128. In the illustrated embodiment, the RAKE receiver 112 includes four receiver fingers but any suitable number of fingers may be used. The purpose of the RAKE receiver is to constructively combine the signals from the discernible multipath components present in the communications channel to increase the signal to noise ratio (SNR).

Figure 2:
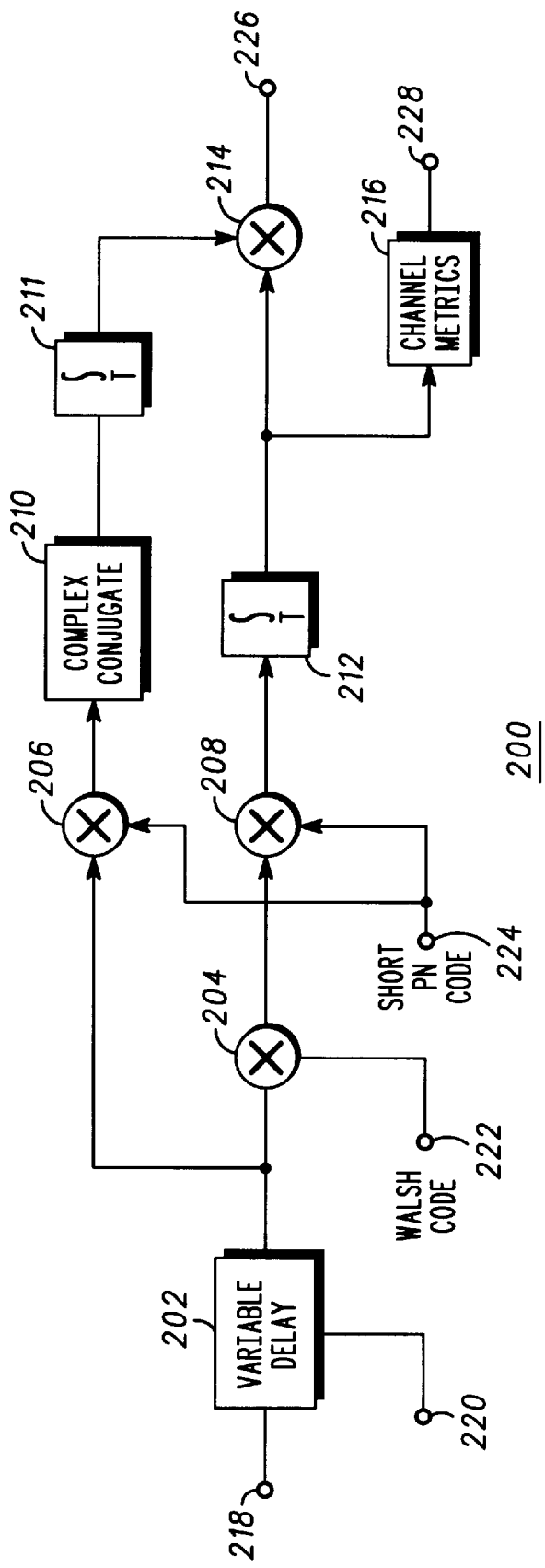
FIG. 2 is shows a finger of a RAKE receiver.

Referring to FIG. 2, structure of a receiver finger 200 is shown. The receiver finger 200 includes a variable delay 202, a despreader 204, a despreader 206, a despreader 208, a complex conjugate circuit 210, an integrator 211, an integrator 212, a multiplier 214 and a channel metrics evaluator 216.

The variable delay 202 receives input data from the ADC 110 (FIG. 1) at an input 218 and a delay value from the searcher receiver 114 at an input 220. The input data correspond to an individual multipath ray received by the finger 200. The input data is delayed by the delay value at the input 220. The variable delay 202 in each of the receiver fingers operates to time align the rays. The last-received ray is delayed by a zero or minimal amount. Each earlier-received ray is delayed by an amount sufficient to time align the input data with the last-received ray.

The delayed input data is provided to the despreader 204 which also receives the Walsh code for that ray at an input 222. The despreader 204 removes the spreading effects of the Walsh code. The despread data are then provided to despreader 208 which also receives the short PN code at an input 224. The despreader 208 removes the effects of the short PN code. The output of the despreader 208 is provided to the integrator 212 which integrates the data over one symbol period, i.e., the period of the 19.2 kilosymbol per second rate. The integrator integrates all energy from one symbol and maximally rejects noise and interference.

The despreader 204 also receives the delayed data from the variable delay 202 and the short PN code from the input 224. The despreader 206, complex conjugate circuit 210 and integrator 211 operate to recover the pilot channel and therefore to provide an estimate of channel phase and channel magnitude.

The multiplier 214 combines the estimate of channel phase and magnitude with the symbol from the integrator 212. This removes the phasing imposed by the channel on the symbol. Since channel phasing is different for each ray, by removing all channel phasing effects, the symbols are made phase coherent. Moreover, by multiplying the symbol by the phase magnitude, the symbols are weighted by the magnitude of the channel. Thus, rays which are received more strongly are weighted more heavily for combination with other rays from other fingers. The weighted, phase coherent symbols are provided at an output 226 which is coupled to the combiner 116 (FIG. 1).

The symbol value is also provided to the channel metrics evaluator 216. The channel metrics evaluator 216 determines channel metrics, such as received signal strength and other measures of channel quality. The channel metrics are provided at an output 228 which is coupled to the searcher receiver 114 (FIG. 1).

Referring again to FIG. 1, the receiver fingers time and phase align each of the strongest discernible multipath components of the received signal. In addition, each component is weighted by the relative strength of the component. The timing, phase, and amplitude of each multipath component can be obtained by examination of the pilot signal. The timing of the multipath components is recovered by examination the received pilot in the searcher receiver 114. The searcher receiver 114 ranks all detectable rays from strongest to weakest and assigns the N strongest rays to the N available fingers. This process is referred to as finger assignment and can be done on a periodic basis such as once every 100 milliseconds. The determination of the phase and amplitude estimate for each ray is individually performed in each finger. Each component is also multiplied by the conjugate of the spreading sequence. Note that multiplication by the conjugate of the spreading sequence will result in recovery of the transmitted data sequence in the absence of channel impairments.

The despread, time and phase aligned, and weighted signals from fingers 122, 124, 126, and 128 are then summed to form a composite signal in the combiner 116. Because of the time and phase aligrunent, the transmitted signal from each component will add constructively, while the noise and interference component from each signal will add in a random fashion. The weighting assures that strong signals with a high signal to noise and interference ratio will contribute more strongly to the summation than weaker signals. This guarantees that the output of the summer will always possess a higher SNR than that of the strongest finger under ideal assumptions. Because the individual discernible rays are independently fading, the probability that four rays will all simultaneously exhibit low amplitudes, and hence low SNR, due to fading is much lower than the probability that any one ray will. Therefore, the RAKE receiver 112 provides an effective means to exploit the diversity present in a channel with significant delay spread.

The combiner 116 receives finger outputs from each RAKE receiver finger. The combiner 116 combines the individual finger outputs and produces combined signals. Combined signals from the first and second antennas are demodulated to produce received DS-CDMA signals. When a predetermined criterion is not met, only signals from the first antenna are combined and demodulated. The output of the combiner 116 is provided to the slicer 117. The slicer 117 converts the symbols to bits and provides down conversion or down sampling from the sample rate to the bit rate. The sample rate is the sample rate of the ADC 110 which is typically a multiple of the chip rate. In an IS-95 system, the sample rate is typically eight times the chip rate of 1.2288 Mega-chips per second and the data rate is 19.2 kilo-symbols per second. Down conversion may be provided in other stages, such as the receiver fingers, as well. The output signal from the slicer 117 corresponds to received channel data bits which are subsequently processed in the mobile station 104. It is recognized that in practice some or all of the down conversion can also take place after integrators 211 and 212 with no loss of performance.

The searcher receiver 114 detects pilot signals received by the mobile station 104 from the plurality of base stations including the base station 102. The searcher receiver 114 also receives channel metrics, such as received signal strength (RSS) of each of the received rays detected at the receiver fingers. The searcher receiver 114 detects the relative strength and delays of all received rays and assigns rays from the plurality of base stations to individual fingers according to predetermined algorithms.

The input stage 106 includes a first antenna 130 for receiving communication signals and producing first signals and a second antenna 132 for receiving communication signals and producing second signals. The first antenna 130 and the second antenna 132 each receive the communication signals as a plurality of discernible rays. Preferably, the first antenna 130 and the second antenna 132 provide substantially identical electrical performance and are suitably spaced at the mobile station 104 to provide path diversity for the communication signals transmitted from base station 102 through communications channel 101. Rayleigh fading experienced by common rays at the two antennas will not be highly correlated provided that conventional conditions with respect to antenna separation and/or polarization are met.

In accordance with the present invention, the input stage 106 further includes a delay element 142 coupled to the second antenna 132, the delay element 142 producing delayed signals in response to the second signals from the second antenna 132. The delay element 142 is fabricated using a surface acoustic wave (SAW) filter, ceramic filter or other suitable device. Numerous such devices are readily available. The delay element 142 delays second signals from the second antenna 132 by a predetermined delay time to produce delayed signals. Operation of the delay element will be described further below in conjunction with FIG. 3.

In the illustrated embodiment, the first antenna 130 is coupled to a filter 134 and the second antenna 132 is coupled to a filter 136. The output of the filter 134 is coupled to a low noise amplifier 138 and the output of the filter 136 is coupled to a low noise amplifier 140. The filter 134, filter 136, low noise amplifier 138 and low noise amplifier 140 may be combined and moved after summer 148 or omitted wholly or in part to reduce the parts count, manufacturing cost and complexity of the mobile station 104. However, in applications where these elements are used as shown, performance of the input stage 106 is enhanced.

Further in accordance with the present invention, the input stage 106 includes a summer 148 coupled to the first antenna 130 and the delay element 142 for summing the first signals from the first antenna 130 and the delayed signals from the delay element 142. The summer 148 combines the first signals and the delayed signals, producing combined signals. The summer 148 may be replaced by any suitable element which combines the first signals and the delayed signals. The RAKE receiver 112 is coupled to the summer 148 for receiving the combined signals.

The input stage 106 still further includes a switch 146 and a switch control circuit 144. The switch 146 is coupled between the delay element 142 and the summer 148 for selectively decoupling the summer 148 from the delay element 142 in response to a control signal. The switch control circuit 144 is coupled to the switch for providing the control signal when a predetermined criterion is not met.

In the illustrated embodiment, the switch 146 is shown as a single pole, single throw analog switch. However, any suitable RF switching element may be substituted so that the summer selectively sums the first signals and the delayed signals. Alternatively, the switching operation may be moved to another component of the mobile station 104.

The switch control circuit 144 has an input 150 coupled to the searcher receiver 114. The switch control circuit 144 receives channel metrics from the searcher receiver 114. The channel metrics are used by the switch control circuit 144 for controlling the switch 146. For example, in some applications the searcher receiver 114 detects a received signal strength of multipath rays at each of the plurality of receiver fingers of the RAKE receiver 112. In such applications, the channel metrics correspond to received signal strength for multipath rays received at the fingers of the RAKE receiver 112.

Figure 3:
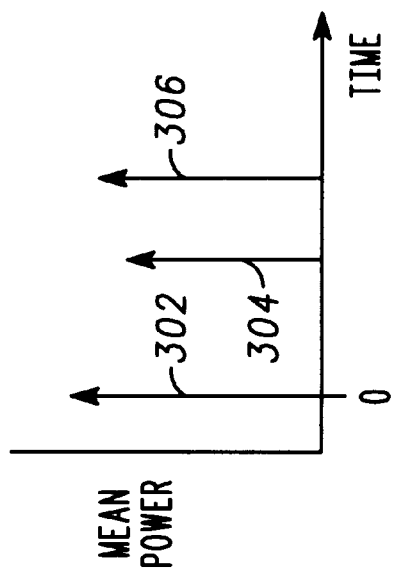
FIG. 3 illustrates a delay spread profile in a typical communication channel such as channel 101 of FIG. 1.

FIG. 3 shows typical delay spread in the communication system of FIG. 1. The delay spread of a received signal is the relative signal strengths and channel delays of all multipath rays seen at the receiver. In FIG. 3, the instantaneous impulse response of a mobile radio channel can be modeled as a number of discernible rays, including a first ray 302, a second ray 304 and a third ray 306. FIG. 3 shows a plot of mean ray power versus time. Over time, each of the received rays experiences amplitude variations modeled by independent Rayleigh processes. Therefore, it is common to refer to the mean value of the signal level of each of the discernible rays in FIG. 3 as the delay spread profile. The signals from two substantially identical antennas with the same orientation and separated by one wavelength will have the same delay spread profile with high probability. However, the Rayleigh fading experienced by common rays from the two antennas will not be highly correlated provided that certain conditions with respect to antenna separation and polarization are met.

Figure 4:
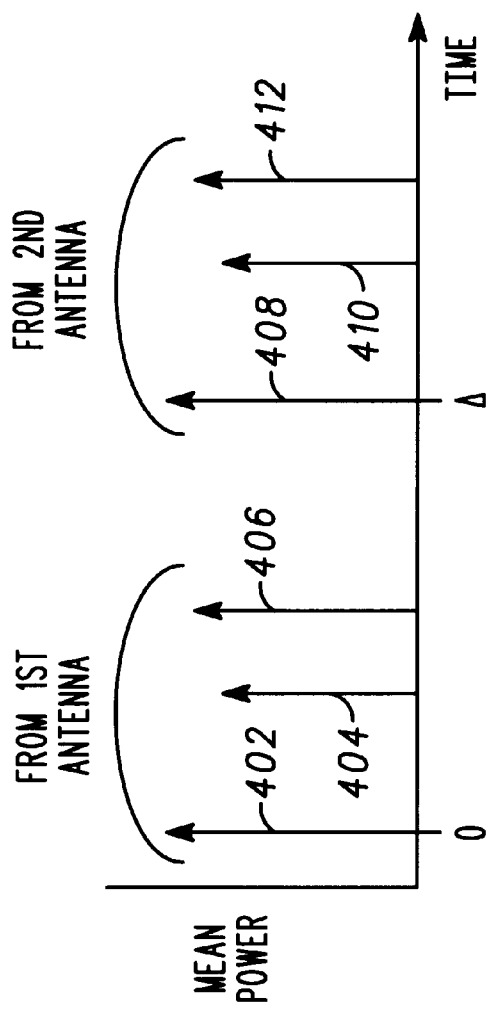
FIG. 4 illustrates delay spread seen by the RAKE receiver of the mobile station of FIG. 1 in accordance with the present invention.

FIG. 4 illustrates delay spread seen by the RAKE receiver of the mobile station of FIG. 1 in accordance with the present invention. In FIG. 4, the signal from the second antenna 132 (FIG. 1) is delayed by Δ and combined with the signal from the first antenna 130, resulting in the illustrated combined delay spread profile. In FIG. 4, the combined delay spread profile includes a ray 402, a ray 404 and a ray 406 contributed by the first antenna 130 and a ray 408, a ray 410 and a ray 412 contributed by the second antenna 132. The contribution from the second antenna 132 is delayed by a predetermined time delay A established by the delay element 142. Because the discernible rays from each antenna are independent, each ray in FIG. 3 will experience independent Rayleigh fading. A RAKE receiver can be used to constructively combine these additional rays contributed by second antenna 132. These additional rays will be added constructively by the combiner 116 providing more diversity resulting in better performance for channels typical of the mobile environment.

The mobile station 104 exhibits the benefits of multipath diversity in a RAKE receiver so long as the fading seen by the two antennas is not highly correlated. The delay spread profiles need not be identical, as shown in FIG. 4, to realize the benefits of diversity as additional independently faded rays will be added even if the delay spread profiles are not identical. Ideally, the received signal from the second antenna 132 is delayed by a time delay greater than the largest anticipated delay spread to prevent rays from the first antenna 130 and the second antenna 132 being added at the same point in time. Two Rayleigh processes added together in such a manner result in a single Rayleigh process with twice the energy. This would cause the RAKE receiver to see only one ray with twice the energy, eliminating much of the diversity gain. To guarantee that two rays never overlap, delay element 142 would need to provide a delay greater than the largest delay expected to be seen on communications channel 101. Smaller delays can be used with a trade off of some loss of performance due to rays from the two antennas occasionally overlapping. This is acceptable in most cases as the greatest performance improvements due to diversity occur on channels with 1 or 2 significant discernible rays. On these channels, overlap will only occur infrequently. In practice, delays as small as the inverse bandwidth of the channel, or 1 chip duration, would be acceptable.

The advantages of the increase in the number of discernible multipath components given by the delay and sum technique according to the present invention can only be realized as long as the total number of discernible rays is less than the number of fingers used in the RAKE receiver 112. After this point is reached, additional rays cannot be used to advantage and in fact will increase the level of intracell interference seen by the mobile station 104, resulting in a rapid decrease in performance. In addition to the intracell interference observed for channels with a larger number of discernible rays than RAKE fingers, a 3 dB increase in intercell interference and thermal noise is observed due to the summation of the signals in the summer 148 from the two antennas. The increase in noise levels is outweighed by the statistical advantage of the additional independent rays up to the point at which significant signal energy is not assigned to a RAKE receiver finger. At this point, any further increase in the number of discernible rays combined by the summer 148 cannot be used and the increased noise and interference levels will decrease performance.

The decrease in performance is avoided by including the switch 146 to remove the second antenna 132 when the channel possesses a high level of discernible multipath. The switch 146 returns the performance to that of a single antenna, first antenna 130, in these situations.

Performance of a DS-CDMA receiver without diversity is generally poorest when there is little multipath. This performance improves rapidly when significant multipath is added. Delay and sum diversity with a switch, in accordance with the present invention, will significantly improve performance of DS-CDMA systems when few discernible rays are present and will not effect performance otherwise. Therefore, this diversity technique can significantly improve performance when DS-CDMA normally performs poorly without degrading performance in channels in which DS-CDMA normally performs well. Moreover, environments with little multipath are very common, so this diversity technique will show significant performance improvements a large percentage of the time.

Figure 5:
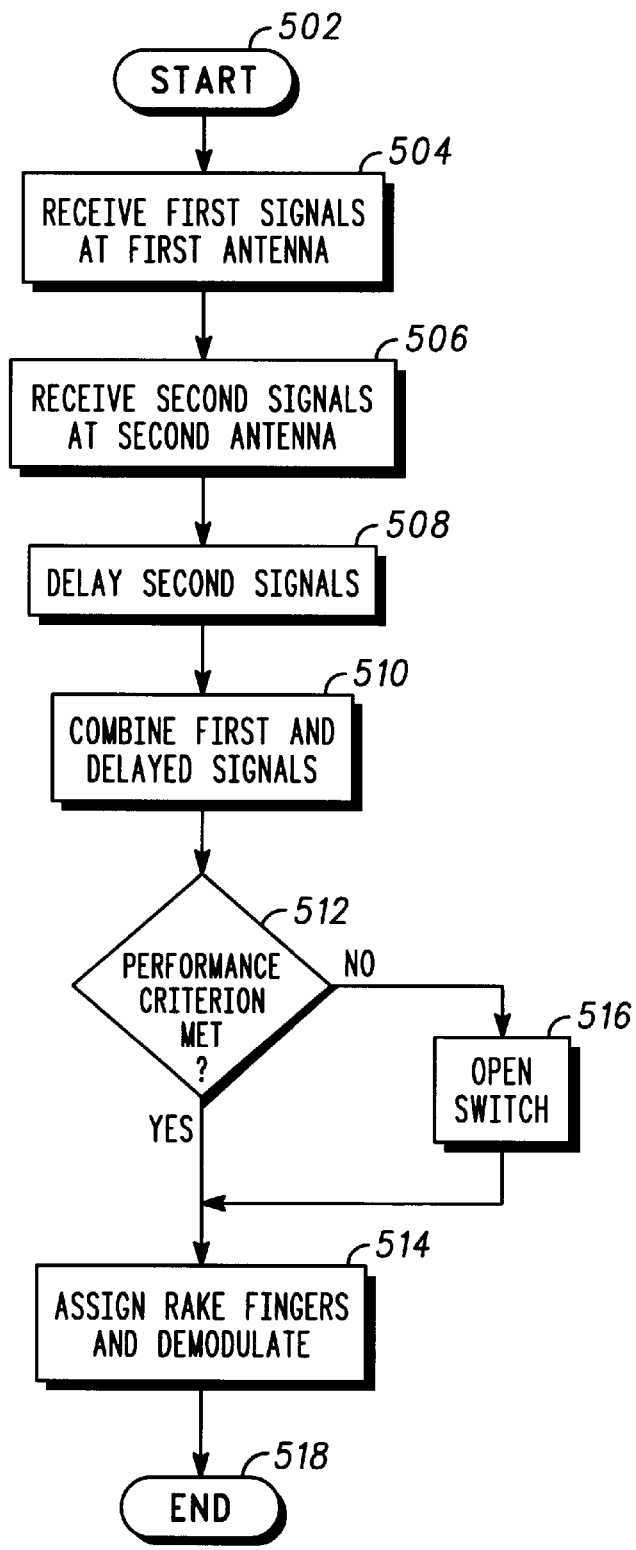
FIG. 5 is a flow diagram illustrating operation of the system of FIG. 1 in accordance with the present invention.

Referring now to FIG. 5, it shows a flow diagram illustrating operation of the system of FIG. 1 in accordance with the present invention. FIG. 5 illustrates a method for receiving DS-CDMA signals in a radio receiver. FIG. 5 also illustrates a method for providing diversity in a mobile DS-CDMA radio receiver. The method begins at step 502.

At step 504, the diversity method includes the steps of providing a first antenna for receiving a first signal. The method includes receiving first signals at the first antenna. At step 506, the method includes the step of providing a second antenna for receiving a second signal. The second antenna is spaced a distance from the first antenna and, in the receiving method, receives second signals.

At step 508, the second signals, including the second multipath components are delayed, producing delayed signals or delayed multipath components. At step 510, the method includes combining the first signals and the delayed signals to produce combined signals. The method further includes combining or summing the first multipath components and the delayed multipath components, producing output multipath components.

At step 512, the method determines if a predetermined criterion is met. The predetermined criterion is any suitable standard or algorithm for determining when the second antenna and delay should be included and the delayed signals combined. This is preferably a function of the estimated channel delay spread profile. When few significant discernible rays are present, the second antenna will be active. When considerable significant discernible rays are present, the second antenna will be removed to prevent increases in intracell interference and the enhancement to intercell interference and noise mentioned previously. Preferably, the decision should be made using easily measured channel conditions and demodulator states.

In one example, the predetermined criterion comprises a measure of multipath energy received by the RAKE receiver in relation to total multipath energy. When the ratio of received signal power or energy in the rays assigned to fingers in the RAKE receiver to the total received signal power falls below a predetermined threshold, the contribution from the second antenna is removed by placing the switch in the open state.

In another example, the method may include interrupting the combining step when a strongest individual received signal strength bears a predetermined relation to total received signal strength. Here, the predetermined criterion comprises a ratio of received signal power detected by a finger of the RAKE receiver which receives a strongest signal to the total received signal power detected by all fingers of the RAKE receiver. In this example, the ratio is determined periodically, such as every 100 msec. The second antenna is included when this ratio is above 75% and excluded when the ratio is below 35%. Other sample periods and ratios are also suitable, and the system does not need to even utilize periodic samples to be effective. A dead period of predetermined duration, such as one second, in which changing the status of the second antenna is precluded, should be included after any change. This will prevent "thrashing," or constant readjustment by the system without reaching any long term equilibrium. Thrashing is to be avoided because of the time required to reassign fingers by the searcher receiver in response to the changes in the delay spread profile. This dead period is a function of the finger assignment and searching algorithms utilized in searcher receiver 114 and is required to allow these algorithms to stabilize after the sudden apparent change in the multipath environment caused by the addition or removal of the second antenna. It is anticipated that changing several characteristics, parameters, and methods used by these algorithms for a short time after a change of state in the switch could reduce or eliminate the need for this dead time. Note that these ratios and periods need not necessarily be fixed and in fact may change as a function of estimated vehicle speed, soft handover status, interference levels, or other factors.

If the switch criterion is met, at step 514 fingers of the RAKE receiver are assigned to individual multipath components and the received signal is demodulated using the combined signals from both the first antenna and the second antenna. If the switch criterion is not met, at step 516 the second antenna and delay element are disconnected, for example, by opening switch 146. The RAKE fingers are then assigned and received signals demodulated using only the signals received from the first antenna. The method ends at step 518.

While this embodiment of the invention describes a diversity receiver which utilizes two antennas, the concepts could easily be extended to three or more antennas. In such an embodiment, each additional antenna would possess a different delay. The switches could be controlled separately, in tandem, or any combination thereof.

As can be seen from the foregoing, the present invention provides apparatus and method for mobile station receiver diversity in a DS-CDMA system. A second antenna receives signals which are delayed in a delay element by one or more chip times and combined with un-delayed signals from a first antenna. When discernible multipath energy is present to the point where much of the received signal energy is not accounted for in the assigned RAKE receiver fingers, the second antenna is switched out to avoid increasing the level of interference.

While a particular embodiment of the present invention has been shown and described, modifications may be made. It is therefore intended in the appended claims to cover all such changes and modifications which fall within the true spirit and scope of the invention.

What is claimed is:

1. A DS-CDMA mobile station comprising:
    a first antenna for receiving communication signals and producing first signals;
    a second antenna for receiving communication signals and producing second signals;
    a delay element coupled to the second antenna, the delay element producing delayed signals in response to the second signals;
    a summer coupled to the first antenna and the delay element for summing the first signals and the delayed signals; and
    a switch coupled between the delay element and the summer for selectively decoupling the summer from the delay element in response to a control signal.

2. A DS-CDMA mobile station as recited in claim 1 further comprising a control circuit coupled to the switch for providing the control signal when a predetermined criterion is not met.

3. A DS-CDMA mobile station as recited in claim 2 further comprising a RAKE receiver coupled to the summer for receiving combined signals, the RAKE receiver having a number of fingers for detecting data symbols in the combined signals.

4. A DS-CDMA mobile station as recited in claim 3 wherein the predetermined criterion is a function of estimated channel delay spread profile.

5. A DS-CDMA mobile station as recited in claim 4 wherein the predetermined criterion comprises a measure of multipath energy received by the RAKE receiver in relation to total multipath energy.

6. A DS-CDMA mobile station as recited in claim 4 wherein the predetermined criterion comprises a ratio of received signal power detected by a finger of the RAKE receiver which receives a strongest signal to total received signal power detected by all fingers of the RAKE receiver.

7. A method for receiving DS-CDMA signals in a radio receiver, the method comprising the steps of:
    receiving first signals;
    receiving second signals
    delaying the second signals, producing delayed signals;
    combining the first signals and the delayed signals, producing combined signals;
    demodulating the combined signals to receive the DS-CDMA signals; and
    demodulating only the first signals when a predetermined criterion is not met.

8. A method as recited in claim 7 wherein the receiving steps comprise receiving the first signals at a first antenna and receiving the second signals at a second antenna.

9. A method as recited claim 8 wherein the first signals and the second signals are received substantially simultaneously.

10. A method as recited in claim 7 wherein the first signals and the combined signals include a plurality of multipath rays and wherein the method further comprises the steps of:

providing a RAKE receiver having a plurality of receiver fingers;

assigning a multipath ray to fingers of the plurality of receiver fingers;

detecting a received signal strength of the multipath ray at each of the plurality of receiver fingers; and interrupting the combining step when strongest individual received signal strength bears a predetermined relation to total received signal strength.

11. A method for providing diversity in a mobile DS-CDMA radio receiver, the method comprising the steps of:

providing a first antenna for receiving first multipath components;

providing a second antenna for receiving second multipath components, the second antenna spaced a distance from the first antenna;

delaying the second multipath components, producing delayed multipath components;

selectively combining the first multipath components and the delayed multipath components, producing combined multipath components;

producing output multipath components in response to one of the first multipath components and the combined multipath components;

selectively decoding a predetermined number of the output multipath components;

detecting a predetermined criterion;

producing the first multipath components as the output multipath components when the predetermined criterion is not met; and producing the combined multipath components as the output multipath components when the predetermined criterion is met.

12. A communication system comprising:

a base station which transmits communication signals;

a mobile station for radio communication with the base station, the mobile station including a first antenna for receiving the communication signals and producing first signals;

a second antenna for receiving the communication signals and producing second signals;

a delay element coupled to the second antenna, the delay element producing delayed signals in response to the second signals;

a summer for selectively summing the first signals and the delayed signals;

a RAKE receiver coupled to the summer;

a switch coupled between the delay element and the summer for selectively decoupling the delay element from the summer in response to a control signal; and a control circuit coupled to the switch for providing the control signal when a predetermined criterion is not met.

13. A communication system as recited in claim 12 wherein the predetermined criterion is a function of estimated channel delay spread profile.

14. A communication system as recited in claim 13 wherein the predetermined criterion comprises a measure of multipath energy received by the RAKE receiver.

15. A communication system as recited in claim 13 wherein the first antenna and the second antenna each receive the communication signals as a plurality of rays including both direct line-of-sight rays from the base station and as multipath rays, the switch decoupling the delay element from the summer when a total number of rays is less than a number of fingers of the RAKE receiver.

16. A communication system as recited in claim 12 wherein the delay element delays the second signals by a predetermined delay time to produce the delayed signals.

* * * * *